April 16, 1963 P. N. WOLFE 3,086,143

DISPLAY DEVICE

Filed Nov. 19, 1959 2 Sheets-Sheet 1

WITNESSES

John E. Healy, Jr.

Gordon H. Telfer

INVENTOR

Peter N. Wolfe

BY Charles F. Renz

ATTORNEY

April 16, 1963 P. N. WOLFE 3,086,143

DISPLAY DEVICE

Filed Nov. 19, 1959 2 Sheets-Sheet 2

United States Patent Office 3,086,143
Patented Apr. 16, 1963

3,086,143
DISPLAY DEVICE

Peter N. Wolfe, Penn Hills Township, Allegheny County, Pa., assignor to Westinghouse Electric Corporation, East Pittsburgh, Pa., a corporation of Pennsylvania Filed Nov. 19, 1959, Ser. No. 854,075
7 Claims. (Cl. 315—169)

This invention relates to display devices and more particularly to laminated structures for solid state display devices.

It has been shown in copending application Serial No. 628,421, filed December 14, 1956, entitled "Display Systems" by E. A. Sack, Jr. and assigned to the same assignee as the present invention, now Patent 2,917,667, issued December 15, 1959, that there are several different circuit embodiments for achieving control of the light output of the individual elements of a display device. The display device is comprised of many light producing cells, such as electroluminescent cells. These circuit embodiments generally include a constant source or sources of a time varying voltage applied across an electroluminescent cell for excitation of the cell and one or more nonlinear dielectric capacitors associated with the electroluminescent cell whose effective capacitance undergoes appreciable change with the application of a direct current control potential. The capacitance changes vary the time varying potential drop across the electroluminescent cell and therefore the light output. The nonlinear dielectric capacitor may comprise, for example, a member of the class of ferroelectric type materials, such as barium titanate or barium-strontium titanate, which have been shown to exhibit the referred to capacitance change.

These display systems present several problems in construction. Since each screen element, in order to provide high resolution, must be small, the formation and interconnection of physically separate elements is prohibitive. One possible method of fabrication is set forth in the copending application Serial No. 730,669, filed April 24, 1958, entitled "Solid State Display Screens" by P. M. G. Toulon and assigned to the same assignee as the present invention, now Patent 2,938,135, issued May 24, 1960. In this copending application, the nonlinear dielectric capacitors are machined from a composite body formed of a sheet of nonlinear dielectric material in ceramic form sandwiched between sheets of conductive material. Conductive material remaining after the machining operation provides leads to external power sources as well as serving as capacitor plates. This requires a relatively delicate machining operation.

Another type of structure is that shown in copending application Serial No. 756,182, filed August 20, 1958, entitled "Display Device" by E. A. Sack, Jr. and J. A. Asars and assigned to the same assignee as the present invention, now Patent 2,922,076 issued January 19, 1960, in which the electroluminescent layer, the nonlinear dielectric layer and the necessary electrodes are fabricated in a laminated form. In these structures the electroluminescent layer has a continuous front electrode and elemental back electrodes forming many individual light-producing elements in a unitary structure. A layer of nonlinear dielectric material, usually in ceramic form, having electrodes, bus bars and perhaps other components of a control and signal distribution scheme are printed or otherwise deposited thereon and placed in contact with the electroluminescent layer. This type of structure may be readily made without the necessity of costly machining operations. The present invention is directed to an improvement upon the structure shown in this last-mentioned copending application. More particularly, this invention is concerned with laminated structures comprising a bridge circuit control configuration which has been found to enable a large change in light output for a given control signal applied to each light producing element.

In the bridge circuit configuration for the control of the light output of an electroluminescent cell, as described in copending application Serial No. 730,669, filed April 24, 1958, entitled "Solid State Display Screens" by P. M. G. Toulon and assigned to the same assignee as the present invention, now Patent 2,938,135, issued May 24, 1960, two nonlinear dielectric capacitors are used in each element in separate arms of the bridge and the electroluminescent cell is in the cross-circuit member. It is necessary that the control signal be applied to a point common to the two nonlinear dielectric capacitors and the electroluminescent cell. Fabricating a laminated display screen embodying such a circuit was shown in beforementioned copending application Serial No. 756,182. This structure, however, suffers from the drawback that the control input point is internal to the screen and means must be provided to apply the control signal to each element. This necessitates the bringing of control signals from the back of the screen through the nonlinear dielectric layer to the interface between that layer and the electroluminescent layer.

It is, therefore, a principal object of this invention to provide an improved solid state display device having a laminated structure.

Another object of the present invention is to provide a solid state display device to which control signals may be applied on an external surface.

Another object is to provide a solid state display device to which control signals are applied at a point where they cannot leak into the electroluminescent layer.

Another object is to provide a solid state display device having improved brightness control.

Another object is to provide a solid state display device which may be readily fabricated in a unitary structure comprising many individually controlled light-producing elements.

These and other objects of this invention will be apparent from the following description, taken in accordance with the accompanying drawings throughout which like reference characters indicate like parts, which drawing forms a part of this application and in which.

Figures 1, 2, 3, 4:
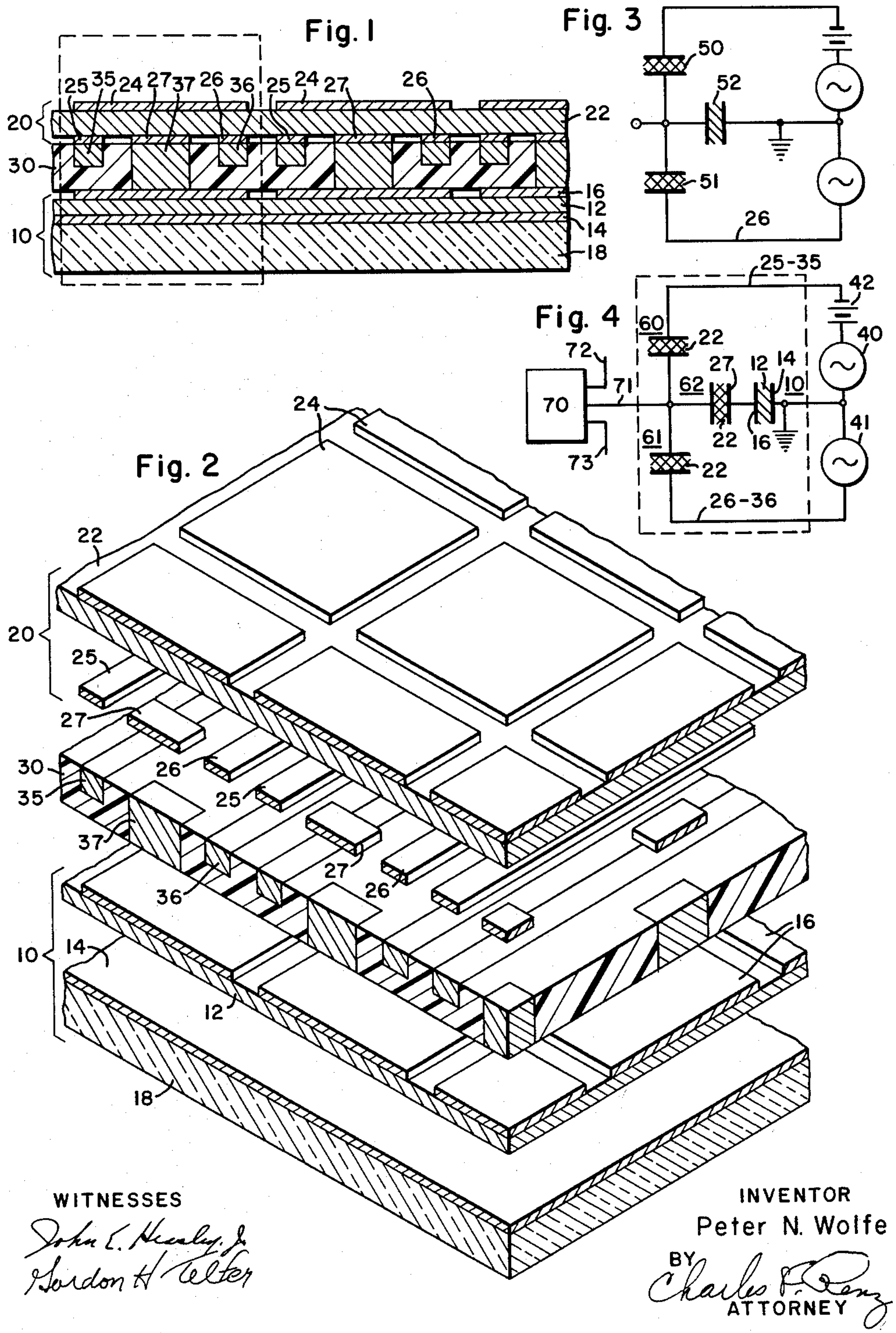
FIGURE 1 shows an enlarged cross sectional view of a display screen embodying the present invention.
FIG. 2 shows an exploded perspective view of the structure of FIG. 1.
FIG. 3 shows the equivalent circuit of prior art display devices of the type on which the present invention improves.
FIG. 4 shows the equivalent circuit of the display device of FIGS. 1 and 2.

Referring now to FIGS. 1 and 2, there is shown a portion of a multielement display device having a large area light-producing structure 10 comprising a layer of material 12 which includes an electroluminescent phosphor and a dielectric binder. A continuous, light transmissive, conductor 14 is disposed on the front surface of the electroluminescent layer 12 and elemental electrodes 16 on the back surface thereof. In contact with the front electrode is shown a support member 18 which is transmissive to the light produced by the electroluminescent layer 12 and may conveniently be of glass. The continuous front electrode 14 may be formed by applying tin oxide on the support member 18 in a well-known manner. The back electrodes 16 may be formed by evaporating conductive material such as aluminum through a suitable screen. The electroluminescent layer 12 is more fully discussed in the previously mentioned U.S. patent applications and is generally known in the art; it may, for example, comprise copper activated zinc sulfide in a binder of polyvinyl chloride.

A control structure 20 comprising a layer of nonlinear dielectric material 22, having various electrodes 24, 25, 26 and 27 in a repetitive pattern thereon, is disposed facing the back electrodes 16 on the electroluminescent layer 12. Each element, as defined by the elemental back electrodes 16 on the electroluminescent layer 12, includes four conductive elements or electrodes 24, 25, 26 and 27 applied to the nonlinear dielectric layer 22. A single display screen element is shown enclosed within the dotted line in FIG. 1. Not all of these four electrodes are confined to only one element of the display device, however. On the front surface of the nonlinear dielectric layer 22 two parallel strip electrodes 25 and 26 of relatively small cross-section extend through a row of elements to the edges of the display device. Between the two strip electrodes 25 and 26 of any one element is disposed a control output electrode 27 which electrically connects the nonlinear dielectric layer 22 and the back electrodes 16 of the electroluminescent layer 12. On the back surface of the nonlinear dielectric layer 22 are control input electrodes 24 which are substantially equal in area to the back electrodes 16 on the electroluminescent layer 12.

A nonlinear dielectric material, for purposes of this invention, is a material wherein the time varying component of electric displacement is dependent upon the average value of an applied periodic electric field. Materials which may be termed linear dielectric materials, by reason of not coming within the preceding definition, are, therefore, those wherein the time varying component of electric displacement is independent of the average value of the applied time varying electric field. The significance of this distinction between nonlinear and linear dielectric materials will become apparent hereinafter in the discussion of the operation of a device in accordance with the present invention. The nonlinear dielectric material 22 may be, for example, selected from the group of materials known as ferroelectric materials, particularly those of the barium titanate type. This class includes, for example, barium titanate, barium strontium titanate, barium stannate, sodium columbate, sodium tantalate, potassium columbate and potassium tantalate. The preparation of such a material into a ceramic sheet, suitable for use as the layer 22, is discussed in an article in Bulletin of the American Ceramic Society for May 1954, beginning on page 131, by Callahan and Murray.

A layer of insulating material 30 is shown disposed between the light producing structure 10 and the control structure 20. This layer 30 contains conductors 35, 36 and 37 in contact with the electrodes 25, 26 and 27, respectively, on the back surface of the nonlinear dielectric layer 22. Two bus bars 35 and 36 are in contact with the strip electrodes 25 and 26, respectively, of each element. The element interlayer conductor 37 is in contact with the control output electrode 27 of the nonlinear dielectric layer 22 and the back electrode 16 of the electroluminescent layer 22 for each element. The use of the insulating material 30 is not a necessity but is found desirable in some applications. In some applications it will not be necessary to employ the bus bars in addition to the strip electrodes. The insulating material 30 may be, for example, a resin or plastic which may be poured in a mold in which the conductors 35, 36 and 37 are disposed. Subsequent setting of the insulating material results in a rigid unit which may be joined to the electroluminescent portion 10 and the control portion 20 of the display device. Also, conductive material may be poured into a pattern in a molded glass member as another method of forming the layer 30 with the conductors 35, 36 and 37.

An alternative method to form the display screen structure shown in FIGS. 1 and 2, which has been found more desirable than that just previously described, is to begin by fabricating the control portion 20 of the screen and depositing thereon the electroluminescent layer 12 in the form of electroluminescent phosphor material with either a plastic binder or a glass binder. In the instance in which a plastic binder is used a light transmissive front electrode 14 of evaporated gold may be used. On the other hand, if a glass binder is used and applied to the control structure in the form of a frit with the electroluminescent material included therein, firing of the frit will form a glazed surface upon which a light transmissive conductive layer of tin oxide may be formed in the conventional manner. This type structure is preferred over that just previously described because, if the light producing portion 10 and the control portion 20 are made separately, great surface uniformity is required in order that the two layers may be fitted together with uniform contact over all the elements. In this case, however, suitable means, such as an opaque mask, are necessary to prevent bright areas due to direct excitation of the electroluminescent layer 12 by the busses 25 and 26.

To understand the operation of the present invention, reference should be made to FIG. 4 which shows an equivalent circuit of the display device shown in FIG. 1 and FIG. 2. The components of one element of the device are shown enclosed by the dotted line. Light power sources 40 and 41 and direct current potential source 42 are connected to the strip electrodes 25 and 26, or bus bars 35 and 36, and to the front electrode 14 of the electroluminescent layer, which may conveniently be maintained at ground potential. The front electrode 14 and either one of the electrodes 25 and 26 therefore provide a pair of electrodes with the electroluminescent layer 12 and the nonlinear dielectric layer 22 electrically coupled therebetween. These potential sources 40, 41 and 42 may be common to many elements of the device, that is, a plurality of strip electrode pairs 25, 26 may be supplied in parallel by the potential sources 40, 41 and 42. It is necessary that the light power sources 40 and 41 supply a time varying electric field across the electroluminescent cell 10 of each element. For this purpose, the light power sources 40 and 41 may be A.C. sources supplying, for example, about 300 and 100 volts R.M.S., respectively, at 400 c.p.s. The D.C. bias source 42 may supply about 300 volts D.-C., for example. The control signal for each element is applied to the control input electrode 24 which is conveniently placed on the back of the display device, as shown in FIGS. 1 and 2. The D.C. control signal alters the effective impedance of the nonlinear dielectric capacitors 60, 61 to A.C. potential supplied by the light power sources 40 and 41. This impedance change to A.C. potential is a result of the nonlinear characteristic of the dielectric materials of the capacitors 60, 61. The field across the electroluminescent layer 12 is thereby altered, which results in a change in light output. For further description of the operation of this circuit, see the aforementioned application Serial No. 730,669.

FIG. 3 shows the previously employed bridge circuit which embodies only two nonlinear dielectric capacitors 50 and 51 per element necessitating the application of a control signal between them and the electroluminescent layer 52 leading to the previously mentioned fabrication difficulties such as the necessity of providing access to an electrode on the front surface of the nonlinear dielectric layer. In a device according to the present invention, there are three nonlinear dielectric capacitors 60, 61 and 62 per element, as is shown in FIG. 4, the additional capacitor 62 being disposed in series relationship with the electroluminescent cell 10 in the cross branch of the bridge circuit. The capacitor 62 is formed between the control input electrode 24 and control output electrode 27 for each element. The two other capacitors 61 and 62 are formed between the strip conductors 25 and 26, respectively, and the control input electrode 24 for each element. In this manner the control input electrode 24 serves as one plate of each of the three capacitors 60, 61 and 62.

The circuit of FIG. 4 may be used in association with a signal distribution system which would provide means to apply the control signals to the control input electrodes of a number of elements in a time sequential manner and store signals until a change of light output from the electroluminescent cell 10 is desired. Circuit components for this purpose may also be printed or sprayed, for example, onto the back of the nonlinear dielectric layer 22, in a manner as was described in copending application Serial No. 756,182. In this case the elemental control input electrodes 24 would be provided in a configuration different from that shown in FIGS. 1 and 2, but the elemental control input electrodes 24 would still be disposed on the back surface of the nonlinear dielectric layer 22, for ease in applying control signals, and would still serve as one plate of three different capacitors of which the other plates are disposed on the opposite side of the nonlinear dielectric layer 22. A signal distribution means is schematically shown in FIG. 4 by the unit 70 coupled to the elemental control input electrode 24 through the lead 71. Leads 72 and 73 are shown as representative of leads to other elements which the unit 70 may supply with D.C. control signals.

In a particular embodiment of the present invention which is particularly advantageous, the unit 70 is a source of a signal modulated electron beam and the members 71, 72 and 73 represent the paths taken by the electron beam in scanning, and hence applying a control signal to, the control input electrodes 24 of the elements of the display device. This type of control signal application would obviously be impractical were it not for the fact that a structure has been provided wherein the control input electrodes are exposed on the back of the display device. The manner in which a signal modulated electron beam may be derived and sequentially applied to the elements of the device is well known. A suitable type device is described in U.S. Patent 2,888,593, issued May 26, 1959 and assigned to the same assignee as the present invention.

Figure 5:
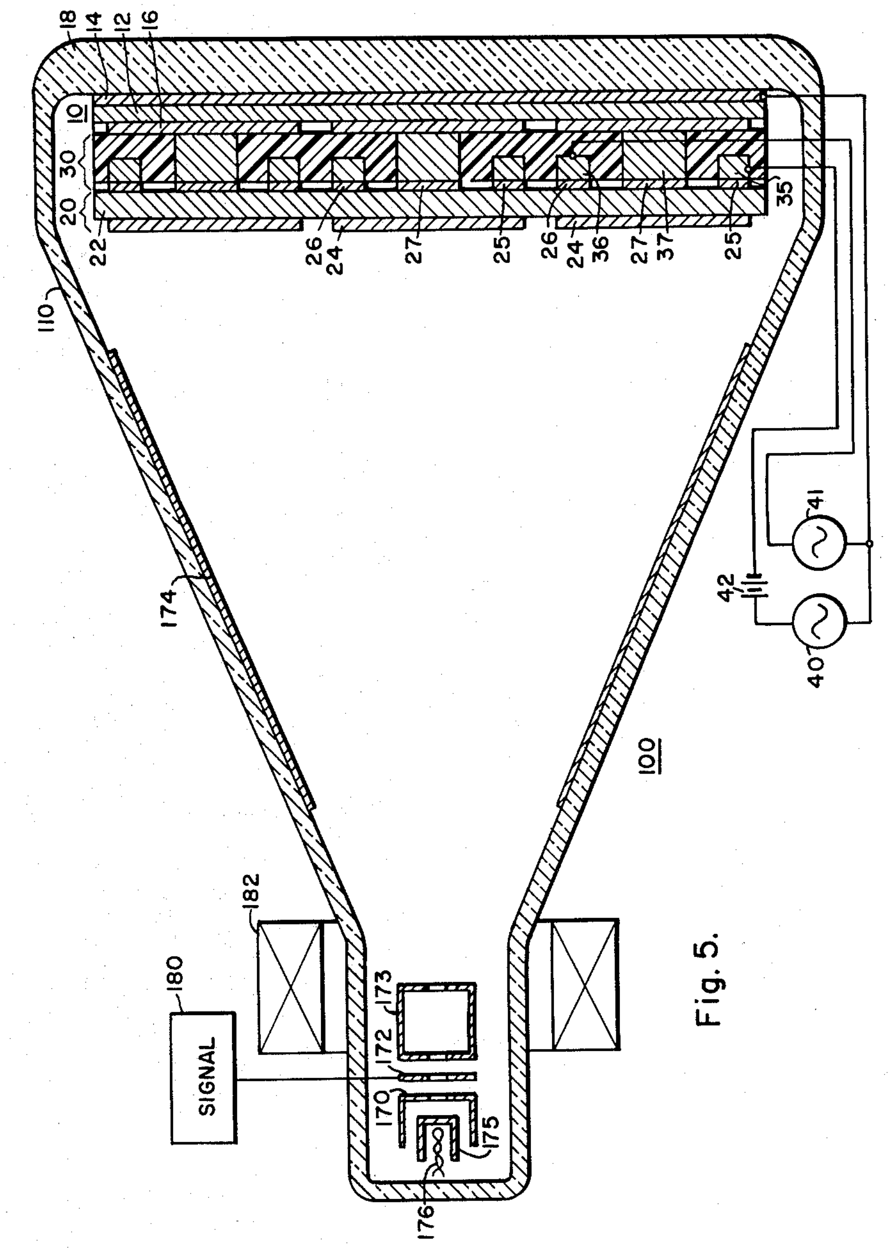
FIG. 5 is a cross sectional view of a cathode ray tube which incorporates the device of FIG. 1.

A fuller illustration of the use of devices in accordance with this invention with electron beam control is shown in FIG. 5. A cathode ray tube 100 is shown having an envelope 110 with electrodes including a thermionic cathode 175 heated by a heater 176, a control grid 170 to which signals from a signal source 180 are applied, a screen grid 172, an accelerating electrode 173 and an accelerating wall electrode 174. The electrode structure may be of any of the well known types to which potentials are applied in a conventional manner to obtain an electron beam. Focusing and deflection means, represented by the coil 182, causes the beam to sequentially scan the control input electrodes 24. The target structure in the cathode ray tube 100 is the device shown in FIG. 1 including the light producing structure 10, the control structure 20 and the insulating layer 30 with the glass support member 18 serving as the face plate of the envelope 110. The manner in which potential is applied to the electrodes of one element 25—35, 26—36 and 14 from the sources 40, 41 and 42 is as shown in FIG. 4.

It will be appreciated that the device of FIG. 5 is merely illustrative. The display portion may include any number of controlled light producing elements as are required and as are permissible by existing fabrication techniques. The dimensions of the device of FIG. 5, particularly the display portion, are greatly exaggerated for clarity in illustration.

Aside from the previously mentioned advantages resulting from the use of structures in accordance with the present invention, this structure provides the advantages of removing any direct current potential from the electroluminescent layer 12 and of preventing leakage of control charges through the electroluminescent layer 12, since the D.C. control signal is not applied to an electrode in contact with the electroluminescent layer. Also, with the proper mode of operation, control of the light output from the electroluminescent layer 12 may be improved by the additional nonlinear dielectric capacitor 60.

While I have shown my invention in only a few embodiments, it will be obvious to those skilled in the art that it is not so limited but is susceptible of various changes and modifications without departing from the spirit and scope thereof.

I claim as my invention:

1. A display device comprising: an electroluminescent layer; a layer of nonlinear dielectric material adjacent said electroluminescent layer; a first pair of electrodes with said electroluminescent layer and said nonlinear dielectric layer electrically coupled therebetween; a source of potential coupled across said first pair of electrodes; control means to alter the potential drop across said nonlinear dielectric layer so as to alter the light output from said electroluminescent layer, said control means comprising, for each controllable element of said electroluminescent layer, second, third and fourth pairs of electrodes disposed across said nonlinear dielectric layer, said second, third and fourth pairs of electrodes including one electrode common to each pair, said common electrode disposed on the side of said nonlinear dielectric layer remote from said electroluminescent layer for the application of a control signal thereto.

2. A display device comprising: an electroluminescent layer disposed between a first pair of electrodes; a source of potential coupled across said first pair of electrodes; control means to vary the effective potential drop across said electroluminescent layer, said control means comprising a layer of nonlinear dielectric material electrically coupled to one of said first pair of electrodes and, for each controllable element of said electroluminescent layer, three nonlinear dielectric capacitors formed by second, third and fourth pairs of electrodes on opposite sides of said nonlinear dielectric layer, one electrode being common to each pair of electrodes; and means to alter the effective capacitance of said nonlinear dielectric capacitors by applying a signal modulated potential to said common electrode, said common electrode being disposed on the side of said nonlinear dielectric layer remote from said electroluminescent layer.

3. A laminated display device comprising: a continuous layer of electroluminescent material having a continuous electrically conductive coating on one surface thereof and a first group of elemental contact electrodes in repetitive pattern on the other surface thereof; a control layer comprising a layer of nonlinear dielectric material having a second group of elemental contact electrodes on one surface thereof facing said electroluminescent layer and disposed in a pattern similar to said first group of electrodes; means positioned between said electroluminescent layer and said dielectric layer to provide electrical connection between corresponding contact electrodes of said first and second group of contact electrodes; a group of control electrodes disposed on the surface of said layer of nonlinear dielectric material remote from said electroluminescent layer and disposed in a similar pattern as said first group of contact electrodes and coextensive therewith; two groups of conductive strips disposed on the opposite surface of said nonlinear dielectric layer from said group of control electrodes, one strip from each of said two groups of strips disposed opposite each of said control electrodes; and means for applying to said control electrodes a signal modulated potential to alter the effective capacitance of said layer of nonlinear dielectric material in accordance with said potential.

4. A display device comprising: a light transmissive conductive layer; an electroluminescent layer having one surface thereof in contact with said light transmissive conductive layer; a layer of nonlinear dielectric material having, for each controllable element of said electroluminescent layer, first, second, third and fourth electrodes thereon, said first electrode being in electrical contact with an elemental area of the surface of said electroluminescent layer, said second and third electrodes being parallel strips disposed to extend across the surface of said layer of nonlinear dielectric material, said fourth electrode disposed on the surface of said layer of nonlinear dielectric material remote from said electroluminescent layer, said first and fourth electrodes thereby defining a first nonlinear dielectric capacitor, said second and fourth electrodes thereby defining a second nonlinear dielectric capacitor, said third and fourth electrodes thereby defining a third nonlinear dielectric capacitor; a first circuit means comprising a first time-varying potential source in series circuit relationship with a constant D.C. potential source, said first circuit means electrically connected across said transmissive conductive layer and said second electrode, a second circuit means comprising a second time-varying potential source electrically connected across said light transmissive conductive layer and said third electrode; said nonlinear dielectric capacitors and said first and second circuit means thereby forming a bridge circuit for the control of light output from said electroluminescent layer as determined by a control signal electrically applied to said fourth electrode.

5. A display device comprising: laminated light producing means and laminated control means coextensive with and in contact with said light producing means, said light producing means comprising an electroluminescent layer; potential means electrically coupled to said light producing means to apply a time varying electric field across said electroluminescent layer; said control means comprising a sheet of nonlinear dielectric material having electrodes disposed thereon in a selected repetitive pattern so as to define a plurality of control elements, each of said control elements comprising a portion of said continuous sheet of nonlinear dielectric material having a first and a second side, said first side disposed remote from said light producing means and said second side facing said light producing means; an elemental input electrode on said first side of said sheet of nonlinear dielectric material; an elemental output electrode on said second side of said nonlinear dielectric material opposite to said elemental input electrode; strip electrodes disposed mutually parallel on said second side of said nonlinear dielectric material and extending through a plurality of control elements, two of said strip electrodes disposed opposite each of said elemental input electrodes; said elemental input electrodes simultaneously serving as one plate of each of three capacitors having said nonlinear dielectric material as the dielectric medium therein, the second plates of said three capacitors comprising said elemental output electrode and said two strip electrodes; said strip electrodes electrically connected to said potential means; said elemental output electrode electrically connected to said light-producing means and serving as one of the plates of the capacitor having said electroluminescent layer as its dielectric medium; and a source of control potential electrically coupled to said control input electrode to vary the effective capacitance of said nonlinear dielectric material and alter the potential and electric field across said electroluminescent phosphor material in accordance with the magnitude of the control signal applied by said source of control potential.

6. A display device comprising a solid state display screen having a light producing portion and a control portion adjacent said light producing portion, and a source of a signal modulated electron beam disposed facing said control portion of said display screen, said control portion comprising at least one electrode on the side thereof facing said electron source for the reception of said signal modulated electron beam, said electrode being capacitively coupled to: (*a*) a pair of electrodes supplied by sources of time varying potentials and (*b*) an electrode electrically coupled directly to said light producing portion of said display screen.

7. A display device comprising: a solid state display screen and a source of an electron beam; said display screen comprising a large area electroluminescent layer having a plurality of individually controllable light producing cells defined by a first plurality of elemental electrodes on the back surface of said electroluminescent layer, a large area nonlinear dielectric layer adjacent said electroluminescent layer and electrically coupled to said elemental electrodes, a pair of potential supply electrodes for each element of said display screen disposed on the front surface of said nonlinear dielectric layer, and a second plurality of elemental electrodes on the back surface of said nonlinear dielectric layer, said second elemental electrodes forming nonlinear dielectric capacitors with said first elemental electrodes and said potential supply electrodes coupled in bridge circuit configuration for each element for the control of light output from each of said light producing cells in accordance with signals applied to said second elemental electrodes in sequential manner by said electron beam.

References Cited in the file of this patent

UNITED STATES PATENTS

| | | |
|---|---|---|
| 2,877,371 | Orthuber | Mar. 10, 1959 |
| 2,877,376 | Orthuber | Mar. 10, 1959 |
| 2,882,419 | Diemer | Apr. 14, 1959 |
| 2,905,830 | Kazan | Sept. 22, 1959 |
| 2,922,076 | Sack | Jan. 19, 1960 |
| 2,967,904 | Toulon | Jan. 10, 1961 |